United States Patent
Hatano (10) Patent No.: US 12,395,056 B2
(45) Date of Patent: Aug. 19, 2025

(54) ACTUATOR WITH COIL HOLDER HAVING THIN FIXING PART

(71) Applicant: NIDEC INSTRUMENTS CORPORATION, Nagano (JP)

(72) Inventor: Shinji Hatano, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 237 days.

(21) Appl. No.: 18/454,770

(22) Filed: Aug. 23, 2023

(65) Prior Publication Data
US 2024/0072629 A1    Feb. 29, 2024

(30) Foreign Application Priority Data
Aug. 30, 2022   (JP) ................ 2022-136505

(51) Int. Cl.
*H02K 33/16*   (2006.01)
*H02K 33/18*   (2006.01)

(52) U.S. Cl.
CPC ........ *H02K 33/18* (2013.01); *H02K 33/16* (2013.01)

(58) Field of Classification Search
CPC .............. H02K 33/16; H02K 33/18
See application file for complete search history.

(56) References Cited

U.S. PATENT DOCUMENTS

| | | | |
|---|---|---|---|
| 10,951,104 B2 | 3/2021 | Takeda et al. | |
| 2019/0190365 A1* | 6/2019 | Takeda | H02K 33/18 |
| 2019/0305630 A1* | 10/2019 | Mori | H01F 27/2823 |
| 2019/0305658 A1* | 10/2019 | Mori | H02K 33/12 |
| 2019/0314860 A1 | 10/2019 | Katada | |
| 2019/0315070 A1* | 10/2019 | Yanagisawa | H02K 33/16 |
| 2019/0326803 A1* | 10/2019 | Hasegawa | H02K 33/18 |
| 2020/0099272 A1* | 3/2020 | Taguchi | F16F 15/08 |
| 2020/0204054 A1* | 6/2020 | Mori | H02K 33/02 |
| 2020/0248772 A1* | 8/2020 | Hinata | F16F 1/3605 |

FOREIGN PATENT DOCUMENTS

JP    2020162393    10/2020

* cited by examiner

*Primary Examiner* — Tulsidas C Patel
*Assistant Examiner* — Robert E Mates
(74) *Attorney, Agent, or Firm* — JCIPRNET (57) ABSTRACT

An actuator includes a movable body, a support body having a coil holder, a connection body connected with the movable body and the support body, and a magnetic drive circuit having a coil held by the coil holder and a magnet for vibrating the movable body. The coil holder has a plate part which surrounds at least a part of the coil, and the movable body has a yoke holding the magnet. The plate part has a coil holding part along an outer edge of the coil and a connection body fixing part whose plate thickness is thinner than that of the coil holding part. The connection body includes at least one of a first connection body connecting a first facing part of the yoke with the connection body fixing part and a second connection body connecting a second facing part of the yoke with the connection body fixing part.

7 Claims, 7 Drawing Sheets

ACTUATOR WITH COIL HOLDER HAVING THIN FIXING PART

CROSS REFERENCE TO RELATED APPLICATION

The present invention claims priority under 35 U.S.C. § 119 to Japanese Application No. 2022-136505 filed Aug. 30, 2022, and the entire content of which is incorporated herein by reference.

TECHNICAL FIELD

At least an embodiment of the present invention may relate to an actuator which vibrates a movable body.

BACKGROUND

In Japanese Patent Laid-Open No. 2020-162393 (Patent Literature 1), an actuator is disclosed which includes a movable body having a magnet and a support body having a coil, and which is structured to vibrate the movable body with respect to the support body by supplying a drive current to the coil. Such an actuator uses an elastic body or a viscoelastic body as a connection body which connects the movable body with the support body. In the actuator described in Patent Literature 1, a gel state member such as silicone gel is used as the connection body.

In Patent Literature 1, the support body includes a case made of metal which defines an outer shape of the actuator and a coil holder made of resin. A coil is an air core coil and is disposed in a coil arrangement hole provided in the coil holder. The movable body includes a first yoke which faces the coil from one side in its thickness direction and a second yoke which faces the coil from an opposite side to the first yoke, and a magnet is fixed to each face facing the coil of the first yoke and the second yoke.

In Patent Literature 1, the coil holder is attached with a first plate which covers a plate part formed with the coil arrangement hole from one side in a plate thickness direction, and a second plate which covers the plate part from the other side in the plate thickness direction. The connection body is disposed at a position where the first plate and the first yoke face each other and a position where the second plate and the second yoke face each other. When an electric current is supplied to the coil, the movable body vibrates in a direction intersecting a direction in which the coil and the magnet face each other. In this case, the connection body which connects the first plate with the first yoke and the connection body which connects the second plate with the second yoke are deformed in a shearing direction.

In the actuator, in order to increase acceleration when the movable body vibrates, a gap between the magnet and the coil is required to reduce. However, in the structure described in Patent Literature 1, when a gap between the magnet and the coil is reduced, a thickness of the connection body (gel state member) is also reduced. In a case that a gel state member is shear-deformed, when a thickness of the gel state member is made too small, stable vibration may not be attained. For example, in a case that a thickness of a gel state member is smaller than an amplitude of a movable body, the gel state member may peel off from its joined surface.

SUMMARY

In view of the problem described above, at least an embodiment of the present invention may advantageously provide an actuator in which a gap between a magnet and a coil can be reduced and, in addition, a thickness of a connection body can be secured.

According to at least an embodiment of the present invention, there may be provided an actuator including a movable body, a support body having a coil holder, a connection body which is connected with the movable body and the support body, and a magnetic drive circuit which includes a coil held by the coil holder and a magnet facing the coil in a first direction and is structured to vibrate the movable body with respect to the support body in a second direction intersecting the first direction. The coil holder is provided with a plate part which surrounds at least a part of the coil, the movable body includes a yoke which holds the magnet, the yoke includes a first facing part which faces the coil from one side in the first direction and a second facing part which faces the coil from the other side in the first direction, and the magnet is fixed to at least one of the first facing part and the second facing part. The plate part is provided with a coil holding part along an outer edge of the coil and a connection body fixing part whose plate thickness in the first direction is thinner than a plate thickness of the coil holding part, and the connection body includes at least one of a first connection body which connects the first facing part with the connection body fixing part and a second connection body which connects the second facing part with the connection body fixing part.

According to at least an embodiment of the present invention, a coil holder which structures a support body of an actuator is provided with a plate part surrounding the coil, and the plate part is provided with a connection body fixing part whose plate thickness is thinner than that of the coil holding part provided along an outer edge of the coil. The connection body which connects a movable body with the support body is disposed at a position where the connection body fixing part whose plate thickness is made thin and a yoke face each other. As described above, when a plate thickness of a portion where the connection body is disposed is made thin, even in a case that a gap between a magnet fixed to the yoke and the coil is reduced, a thickness of the connection body is restrained from becoming small because a thickness of the connection body fixing part is made thinner, and a sufficient thickness of the connection body can be secured. Therefore, acceleration when the movable body vibrates can be increased by reducing the gap between the magnet and the coil and, in addition, a situation can be avoided that a thickness of the connection body becomes too small and the connection body is unable to vibrate stably.

In the present invention, it is preferable that, when a direction intersecting the first direction and the second direction is referred to as a third direction, the coil holding part surrounds one side in the third direction of the coil and the other side in the third direction of the coil, the connection body fixing part includes one side fixing part provided on the one side in the third direction with respect to the coil and the other side fixing part provided on the other side in the third direction with respect to the coil, and the one side fixing part and the other side fixing part are respectively connected with the first facing part and the second facing part through the first connection body and the second connection body. According to this structure, both end portions in the third direction of the coil holder are respectively connected with the yoke through the connection bodies from both sides in the first direction. Therefore, the movable body can be stably supported.

In the present invention, it is preferable that the plate part is provided with a first recessed part which is recessed to the other side in the first direction and a second recessed part which is recessed to the one side in the first direction on an opposite side in the first direction with respect to the first recessed part, the connection body fixing part is a thin wall part whose surfaces are a bottom face of the first recessed part and a bottom face of the second recessed part, the first connection body connects the first facing part with the bottom face of the first recessed part, and the second connection body connects the second facing part with the bottom face of the second recessed part. According to this structure, distances in the first direction with respect to the yoke are respectively widened by depths of the recessed parts on both sides in the first direction of the plate part. Therefore, even in a case that a gap between the coil and the magnet facing the coil from the one side in the first direction and a gap between the coil and the magnet facing the coil from the other side in the first direction are narrowed, a situation can be avoided that a thickness of the connection body becomes too small and the movable body is unable to vibrate stably.

In the present invention, it is preferable that the support body includes a first plate made of metal which is overlapped with the coil and the coil holding part from the one side in the first direction, and a second plate made of metal which is overlapped with the coil and the coil holding part from the other side in the first direction, and the connection body fixing part is exposed from the first plate and the second plate. According to this structure, the coil can be protected by the first plate and the second plate and thus, even when a gap between the magnet and the coil is narrowed, the coil is less likely to be damaged due to a collision with the magnet. Further, the connection body fixing part is exposed from the first plate and the second plate and thus, a height in the first direction of an arrangement space of the connection body does not become lower. Therefore, a thickness of the connection body can be secured.

In the present invention, it is preferable that the first plate is provided with a first fixing part which is bent from both ends in the second direction to the other side in the first direction and is engaged with a side face in the second direction of the coil holding part, and the second plate is provided with a second fixing part which is bent from both ends in the second direction to the one side in the first direction and is engaged with the side face in the second direction of the coil holding part. According to this structure, the first plate, the second plate, the coil holder and the coil are assembled to be capable of being handled as a coil assembly. Therefore, even when the coil holder is divided into two members, the actuator can be easily assembled.

In the present invention, it is preferable that, when a direction intersecting the first direction and the second direction is referred to as a third direction, the coil holder includes a first holder member disposed on one side in the third direction with respect to the coil and a second holder member disposed on the other side in the third direction with respect to the coil, the coil holding part includes a first coil holding part provided at an end part on the other side in the third direction of the first holder member, and a second coil holding part which is provided at an end part on the one side in the third direction of the second holder member, and the connection body fixing part includes one side fixing part which is provided on the one side in the third direction of the first coil holding part, and the other side fixing part which is provided on the other side in the third direction of the second coil holding part. As described above, the coil holder is divided into two members and thus, portions covering both sides in the second direction of the coil can be omitted. As a result, a size in the second direction of the movable body can be reduced and a size in the second direction of the actuator can be attained.

In the present invention, it is preferable that, when a direction intersecting the first direction and the second direction is referred to as a third direction, the coil holder is provided with a first holder side plate part which is extended in the first direction at an end part on one side in the third direction of the coil holder, a board is fixed to the first holder side plate part, the plate part is provided with a groove in which a coil wire extended from the coil is disposed, and the groove is extended to a cut-out part, which is formed by cutting out the first holder side plate part in the first direction, through surfaces of the coil holding part and the connection body fixing part. According to this structure, when a coil wire is to be extended to the board, the coil wire can be extended without interfering with the connection body.

According to the present invention, the coil holder which structures the support body of the actuator is provided with the plate part surrounding the coil, and the plate part is provided with the connection body fixing part whose plate thickness is thinner than that of the coil holding part provided along an outer edge of the coil. The connection body which connects the movable body with the support body is disposed at a position where the connection body fixing part whose plate thickness is thin and the yoke face each other. As described above, when a plate thickness of the portion where the connection body is disposed is made thinner, even in a case that a gap between the magnet fixed to the yoke and the coil is reduced, a thickness of the connection body is restrained from becoming small because a thickness of the connection body fixing part is made thinner, and a sufficient thickness of the connection body can be secured. Therefore, acceleration when the movable body is vibrated can be increased by reducing the gap between the magnet and the coil and, in addition, a situation can be avoided that a thickness of the connection body becomes too small and the connection body is unable to vibrate stably.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an actuator to which the present invention is applied will be described below with reference to the accompanying drawings.
(Entire Structure)

Figure 1A:
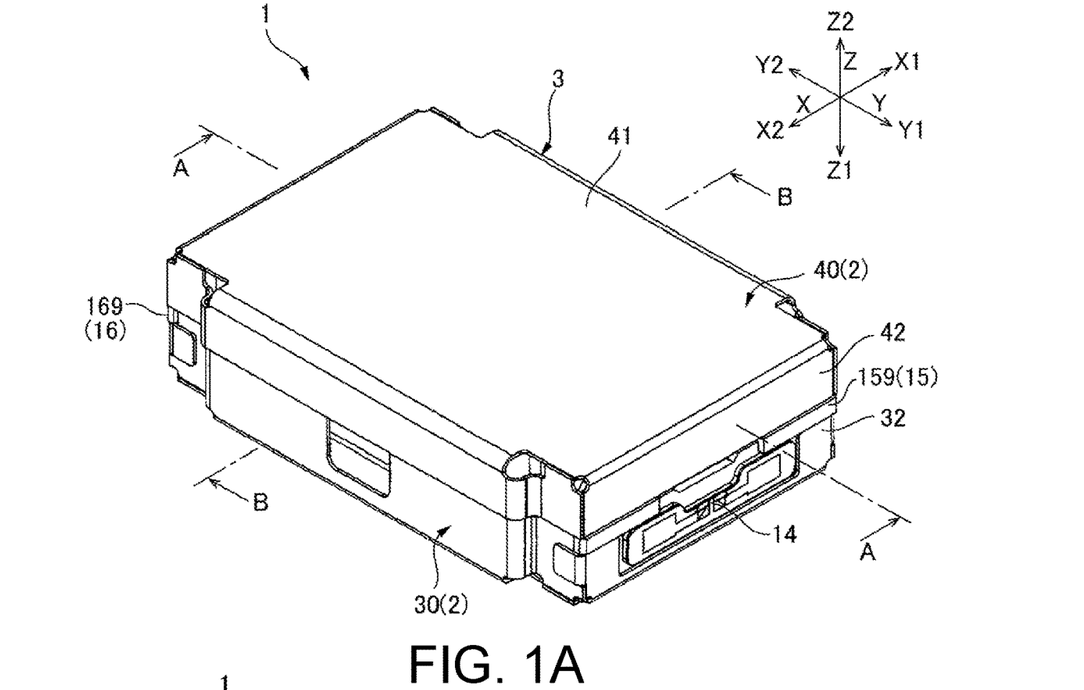
FIGS. 1A and 1B are perspective views showing an actuator in accordance with an embodiment of the present invention which are viewed from the "Z2" direction side and the "Z1" direction side.
Figure 1B:
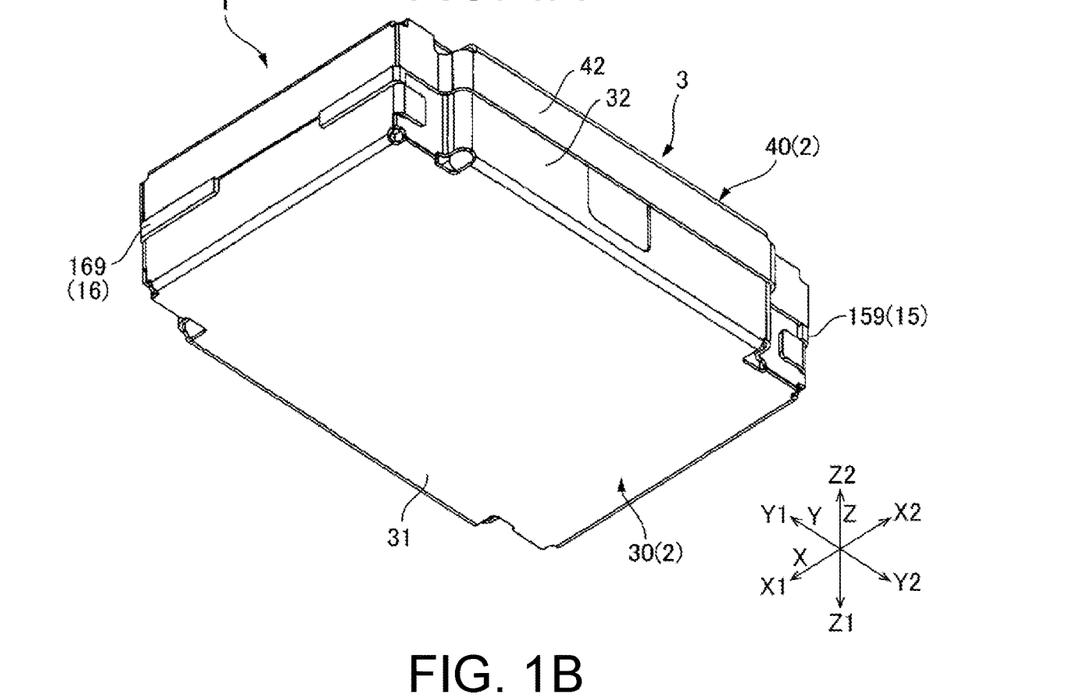
Figure 2:
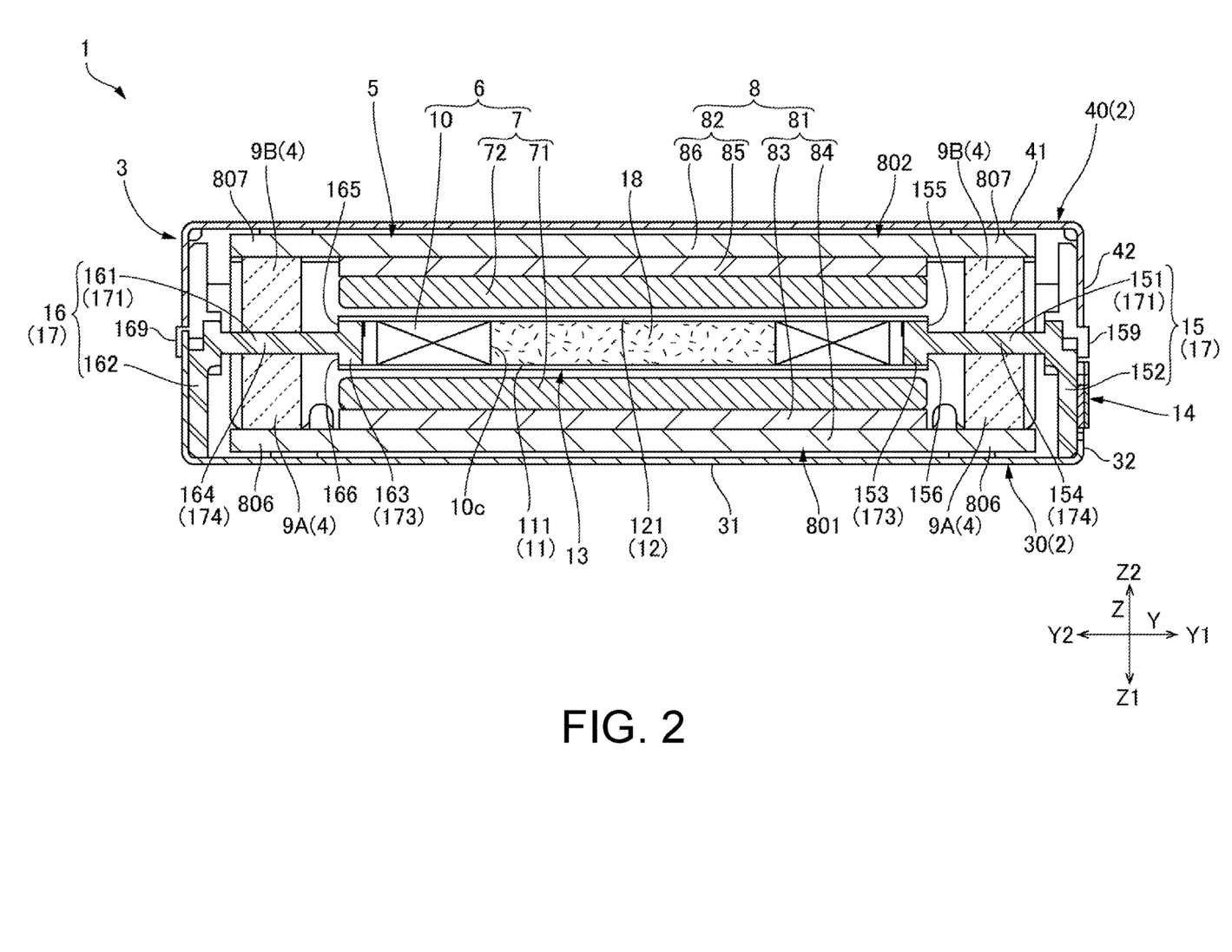
FIG. 2 is a cross-sectional view showing an actuator which is cut in a longitudinal direction (cross-sectional view showing the actuator which is cut at the "A-A" position in FIG. 1A).
Figure 3:
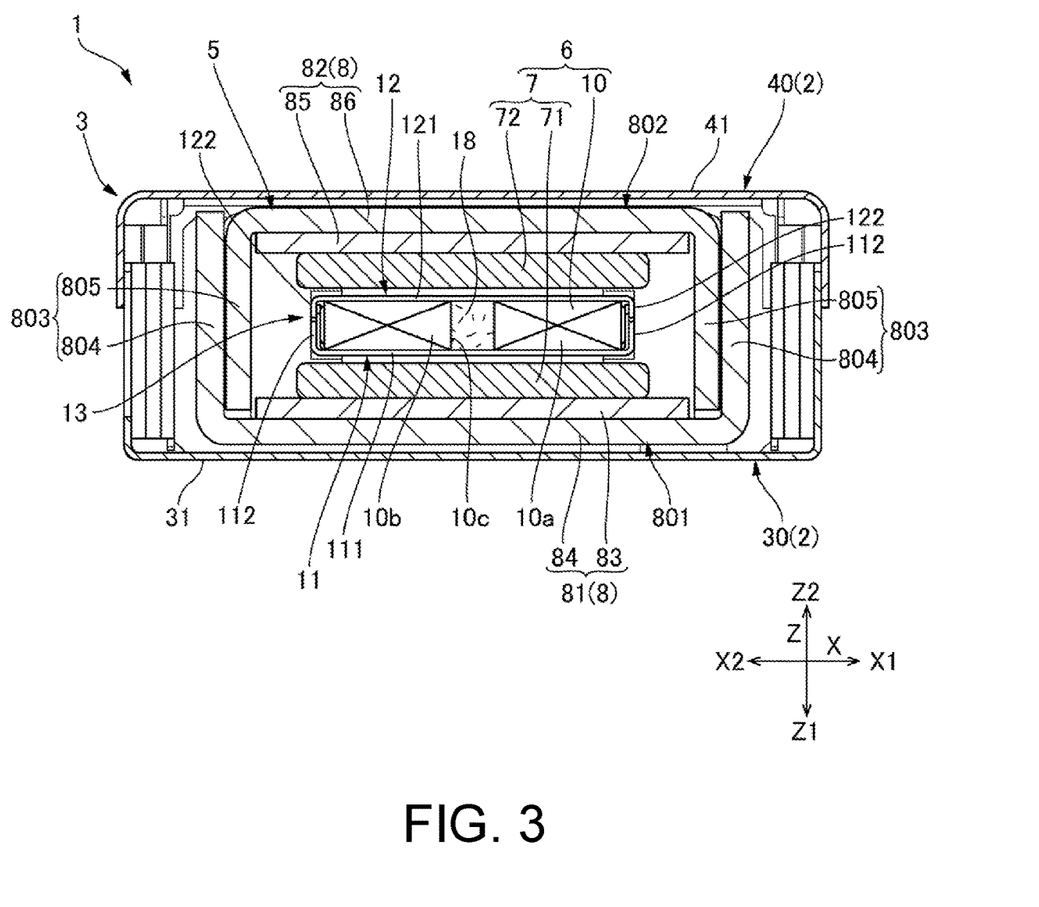
FIG. 3 is a cross-sectional view showing an actuator which is cut in a direction perpendicular to a longitudinal direction (cross-sectional view showing the actuator which is cut at the "B-B" position in FIG. 1A).
Figure 4:
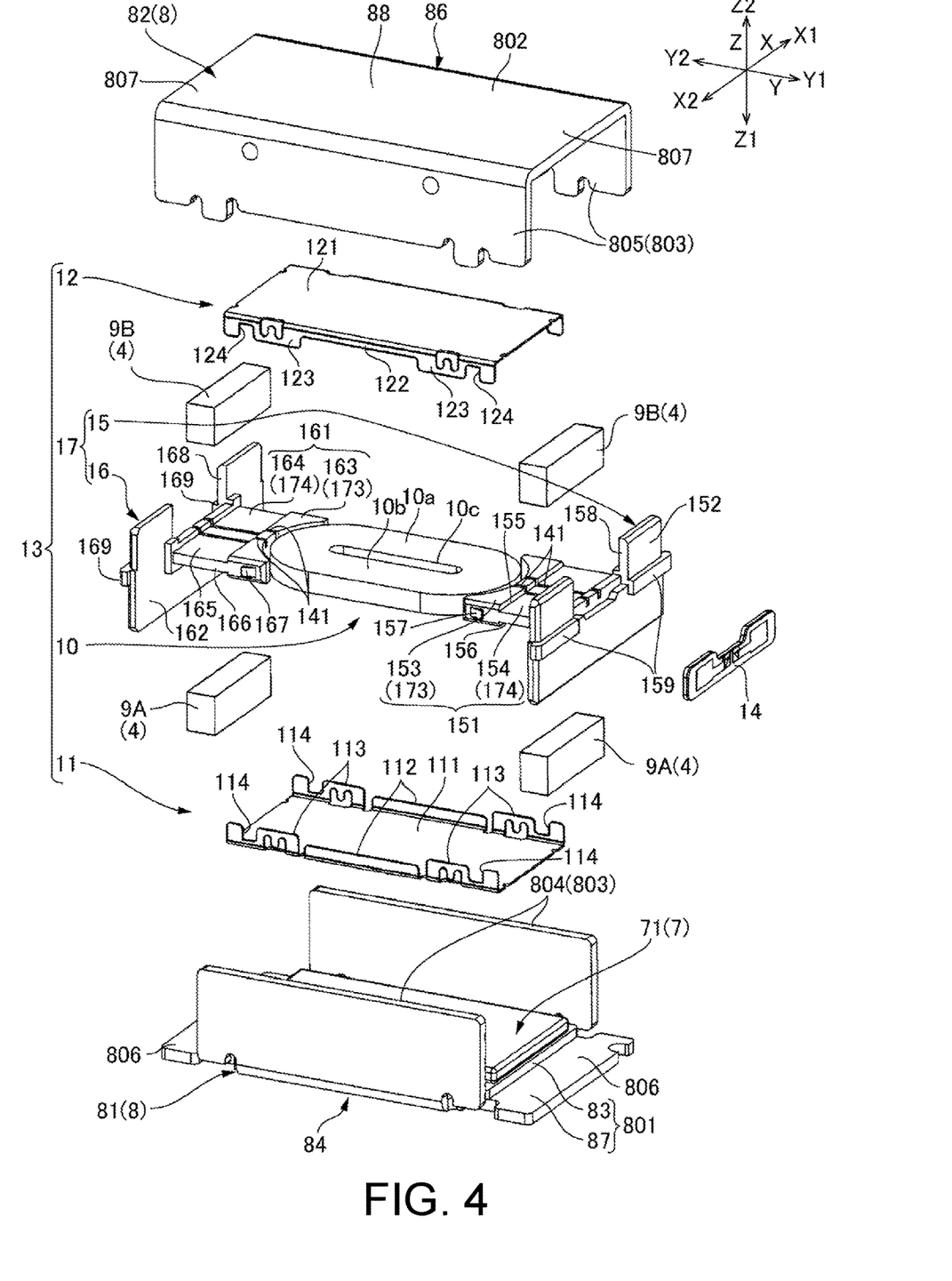
FIG. 4 is an exploded perspective view showing a movable body and a coil assembly which are viewed from the "Z2" direction side.
Figure 5:
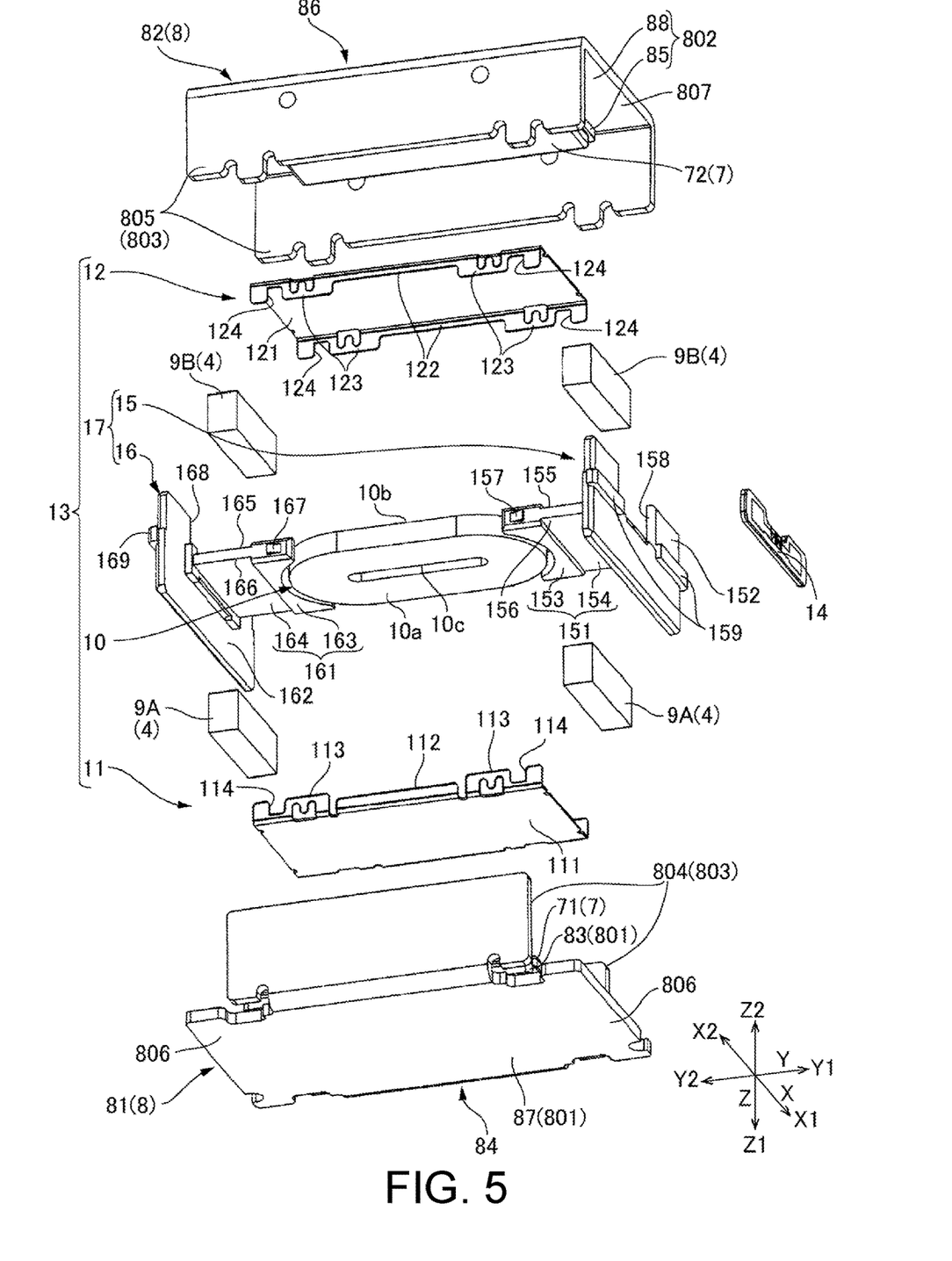
FIG. 5 is an exploded perspective view showing a movable body and a coil assembly which are viewed from the "Z1" direction side.
Figure 6:
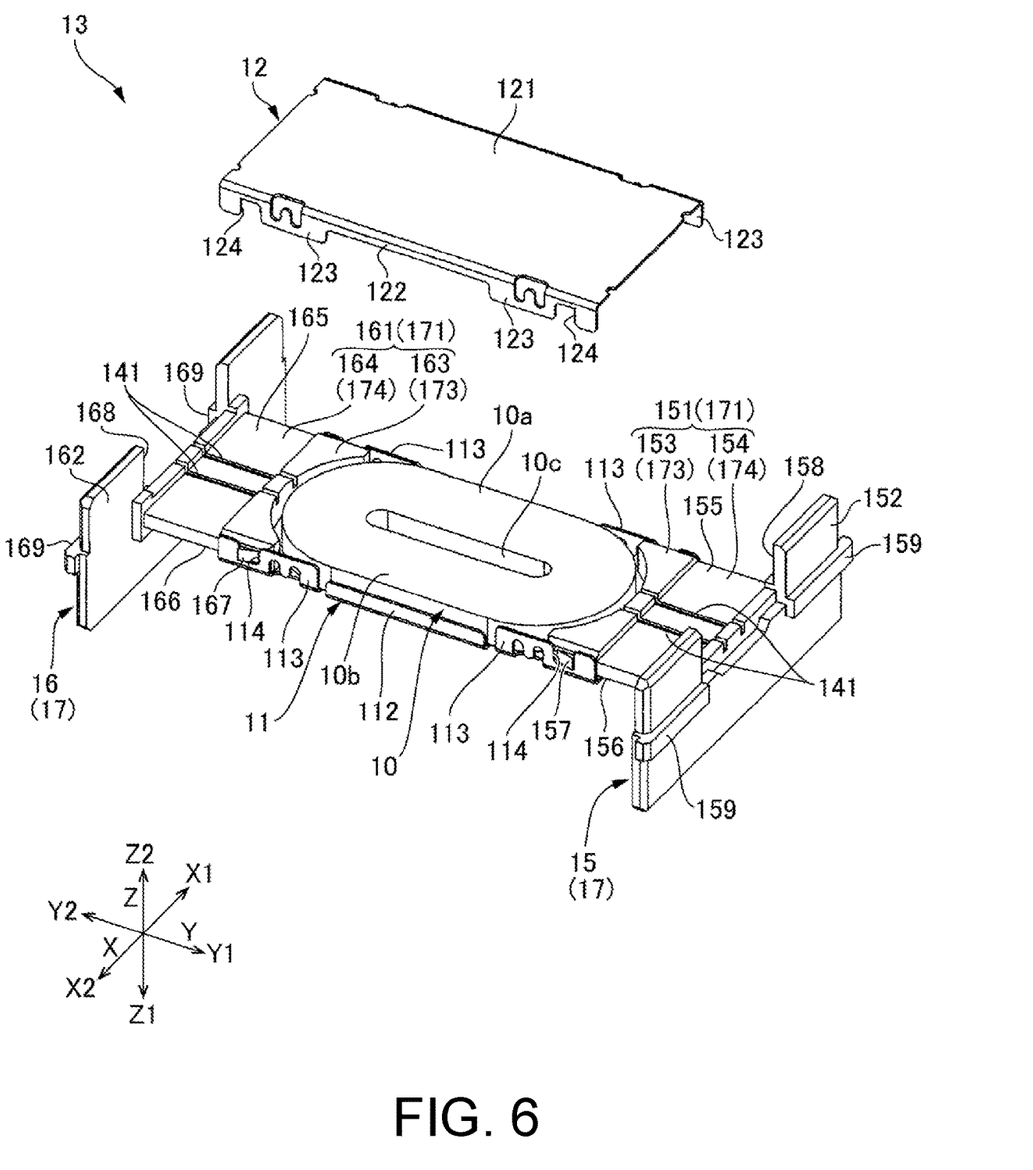
FIG. 6 is an exploded perspective view showing an assembly method of a coil assembly.
Figure 7:
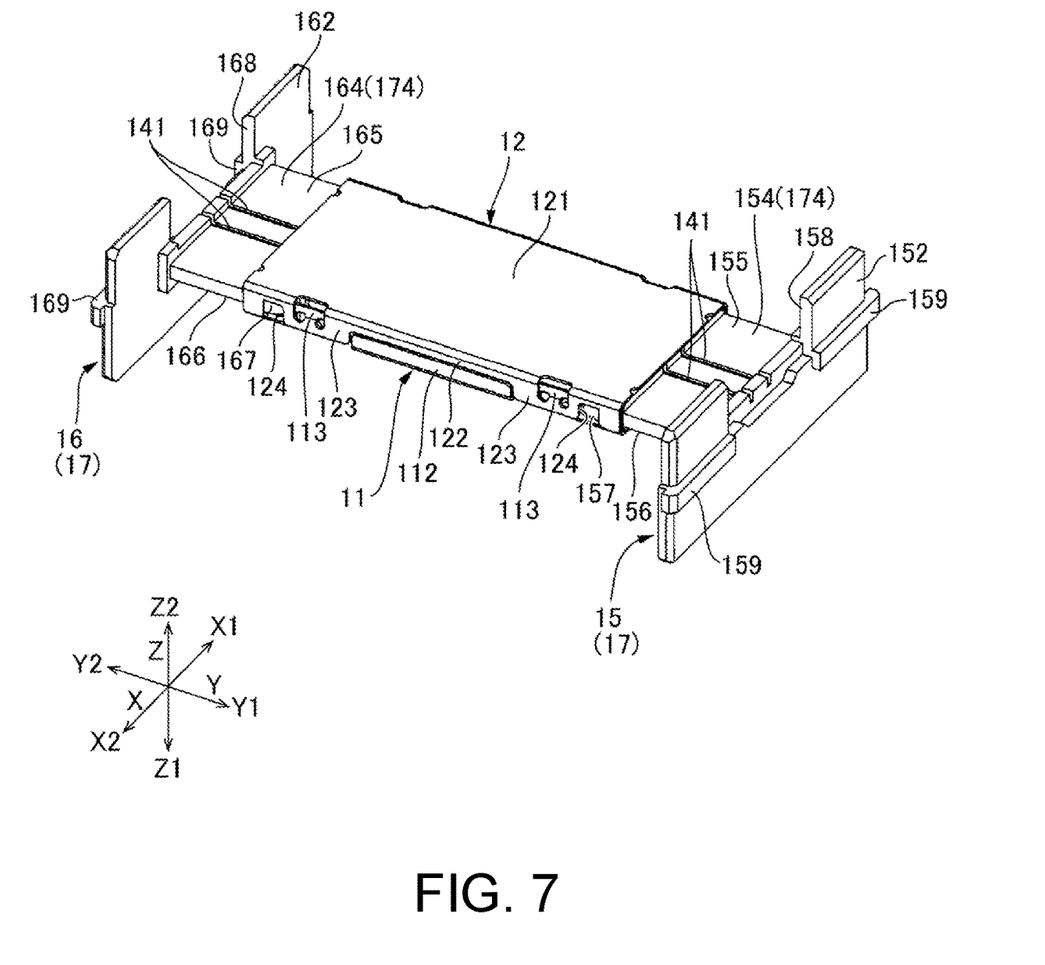
FIG. 7 is a perspective view showing a coil assembly.

FIG. 1A is a perspective view showing an actuator 1 which is viewed from the "Z2" direction side in accordance with an embodiment of the present invention. FIG. 1B is a perspective view showing the actuator 1 which is viewed from the "Z1" direction side. FIG. 2 is a cross-sectional view showing the actuator 1 which is cut in a longitudinal direction and is a cross-sectional view showing the actuator 1 which is cut at the "A-A" position in FIG. 1A. FIG. 3 is a cross-sectional view showing the actuator 1 which is cut in a direction perpendicular to the longitudinal direction and is a cross-sectional view showing the actuator 1 which is cut at the "B-B" position in FIG. 1A. FIG. 4 is an exploded perspective view showing a movable body 5 and a coil assembly 13 which are viewed from the "Z2" direction side. FIG. 5 is an exploded perspective view showing the movable body 5 and the coil assembly 13 which are viewed from the "Z1" direction side. FIG. 6 is an exploded perspective view showing an assembly method of the coil assembly 13. FIG. 7 is a perspective view showing the coil assembly 13.

An actuator 1 is used as a tactile device which is structured to transmit information by vibration. As shown in FIGS. 1A and 1B, an outer shape of the actuator 1 is a rectangular parallelepiped shape. The actuator 1 generates vibration in a shorter direction of the outer shape. In the following descriptions, a shorter direction in which the vibration is generated is defined as an "X" direction (second direction), a direction which is a longitudinal direction of the actuator 1 and is perpendicular to the "X" direction is defined as a "Y" direction (third direction), and a direction which is a thickness direction (height direction) of the actuator 1 and is perpendicular to the "X" direction and the "Y" direction is defined as a "Z" direction (first direction). Further, one side in the "X" direction is referred to as an "X1" direction side, and the other side is referred to as an "X2" direction side. One side in the "Y" direction is referred to as a "Y1" direction side, and the other side is referred to as a "Y2" direction side. One side in the "Z" direction is referred to as a "Z1" direction side, and the other side is referred to as a "Z2" direction side.

As shown in FIGS. 1A through 3, the actuator 1 includes a support body 3 having a case 2 which defines an outer shape of the actuator 1 and a movable body 5 which is accommodated on an inner side of the case 2. Further, the actuator 1 includes a connection body 4 which connects the support body 3 with the movable body 5 and a magnetic drive circuit 6 structured to relatively move the movable body 5 in the "X" direction with respect to the support body 3.
(Support Body)

The support body 3 includes the case 2 and a coil assembly 13. As shown in FIGS. 4 through 7, the coil assembly 13 includes a coil 10, a coil holder 17 which surrounds the "Y1" side and the "Y2" side of the coil 10, a first plate 11 overlapped with the coil 10 from the "Z1" direction side, and a second plate 12 overlapped with the coil 10 from the "Z2" direction side. The first plate 11 and the second plate 12 are made of nonmagnetic metal.

As shown in FIGS. 2 and 3, the coil 10 is located at a center in the "Z" direction of the case 2. The coil 10 is a flat air core coil whose thickness direction is directed in the "Z" direction. As shown in FIGS. 4 and 5, the coil 10 is formed in an elliptical shape which is long in the "Y" direction and is provided with a pair of long side parts 10a and 10b which are extended in parallel with the "Y" direction. A center hole 10c which is extended in the "Y" direction is provided between a pair of the long side parts 10a and 10b.
(Coil Holder)

As shown in FIGS. 4 and 5, the coil holder 17 is divided into two members. The coil holder 17 includes a first holder member 15 disposed on the "Y1" side with respect to the coil 10, and a second holder member 16 which is disposed on the "Y2" side with respect to the coil 10. The first holder member 15 and the second holder member 16 are made of resin.

The first holder member 15 is provided with a first plate part 151 which is extended in the "Y" direction on the "Y1" direction side with respect to the coil 10, and a first holder side plate part 152 which is extended from an end on the "Y1" side of the first plate part 151 to the "Z1" direction side and the "Z2" direction side. The second holder member 16 is provided with a second plate part 161 which is extended in the "Y" direction on the "Y2" direction side with respect to the coil 10, and a second holder side plate part 162 which is extended from an end on the "Y2" side of the second plate part 161 to the "Z1" direction side and the "Z2" direction side.

The coil holder 17 is provided with a plate part 171 whose plate thickness direction is directed in the "Z" direction. In this embodiment, the coil holder 17 is divided into two members, and the plate part 171 is structured of the first plate part 151 and the second plate part 161. The plate part 171 is provided with coil holding parts 173 which surround an outer edge of the coil 10 on the "Y1" side and the "Y2" side with respect to the coil 10. The coil holding part 173 includes a first coil holding part 153 provided at an end part on the "Y2" side of the first plate part 151, and a second coil holding part 163 provided at an end part on the "Y1" side of the second plate part 161. The coil 10 is disposed between the first coil holding part 153 and the second coil holding part 163. The end part on the "Y2" side of the first coil holding part 153 and the end part on the "Y1" side of the second coil holding part 163 are formed in a circular arc shape along the outer edge of the coil 10.

A plate thickness in the "Z" direction of the coil holding part 173 (first coil holding part 153 and second coil holding part 163) is thicker than a thickness in the "Z" direction of the coil 10. The plate part 171 is provided with a connection body fixing part 174 whose plate thickness in the "Z" direction is thinner than that of the coil holding part 173. The plate thickness in the "Z" direction of the connection body fixing part 174 is thinner than the thickness in the "Z" direction of the coil 10. The connection body fixing part 174 includes one side fixing part 154 provided on the "Y1" side of the first coil holding part 153 and the other side fixing part 164 provided the "Y2" side of the second coil holding part 163.

In the first holder member 15, the "Y1" side of the first coil holding part 153 is provided with a first recessed part 155 which is recessed to the "Z1" direction side, and a second recessed part 156 which is recessed to the "Z2" direction side on an opposite side to the first recessed part 155 in the "Z" direction. Depths in the "Z" direction of the first recessed part 155 and the second recessed part 156 are equal to each other. The one side fixing part 154 is a thin wall part in which a bottom face of the first recessed part 155 is its "Z2" direction side face, and a bottom face of the second recessed part 156 is its "Z1" direction side face.

In the second holder member 16, the "Y2" side of the second coil holding part 163 is provided with a first recessed part 165 which is recessed to the "Z1" direction side, and a second recessed part 166 which is recessed to the "Z2" direction side on an opposite side to the first recessed part 165 in the "Z" direction. Depths in the "Z" direction of the first recessed part 165 and the second recessed part 166 are equal to each other. The other side fixing part 164 is a thin wall part in which a bottom face of the first recessed part 165 is its "Z2" direction side face, and a bottom face of the second recessed part 166 is its "Z1" direction side face.

As shown in FIG. 2, the connection body fixing part 174 (one side fixing part 154 and the other side fixing part 164) faces yokes 8 which face from the "Z1" direction side and the "Z2" direction side. As described below, in this embodiment, the movable body 5 and the support body 3 are connected with each other through the connection body 4 (first connection body 9A and second connection body 9B) disposed between the connection body fixing part 174 and the yoke 8.

(Board)

The first holder member 15 is fixed with a power feeding board 14. Electric power is supplied to the coil 10 through the power feeding board 14. Two coil wires (not shown) extended from the coil 10 are disposed in two grooves 141, which are formed on the "Z2" direction side face of the first plate part 151, and are extended to the "Y1" direction side through a cut-out part 158, which is formed by cutting out a center portion in the "X" direction of the first holder side plate part 152 to the "Z1" direction, and are connected with the power feeding board 14 which is fixed on the "Z1" direction side with respect to the cut-out part 158.

In this embodiment, the first holder member 15 and the second holder member 16 have the same shape as each other, but they are disposed in reverse in the "Y" direction. The second holder side plate part 162 is formed with a cut-out part 168 having the same shape as the cut-out part 158 of the first holder side plate part 152, and two grooves 141 are formed on the "Z2" direction side face of the second plate part 161. Therefore, it may be structured that coil wires extended from the coil 10 to the "Y2" direction side are disposed in the grooves 141 of the second plate part 161, and the coil wires are connected with a power feeding board 14 which is fixed to the second holder side plate part 162 instead of the first holder side plate part 152.

(Plate)

The first plate 11 is provided with a first plate part 111 which is overlapped with the coil 10 from the "Z1" side and a pair of first bent parts 112 which are bent to the "Z2" direction side from both ends in the "X" direction of the first plate part 111. The second plate 12 is provided with a second plate part 121 which is overlapped with the coil 10 from the "Z2" side and a pair of second bent parts 122 which are bent to the "Z1" direction side from both ends in the "X" direction of the second plate part 121.

The first plate 11 is provided with first fixing parts 113, which are bent to the "Z2" direction side from the first plate part 111 on the "Y1" side and the "Y2" side with respect to each of the first bent parts 112. The second plate 12 is provided with second fixing parts 123, which are bent to the "Z1" direction side from the second plate part 121 on the "Y1" side and the "Y2" side with respect to each of the second bent parts 122.

When the first plate 11 and the second plate 12 are attached to the first plate part 151 and the second plate part 161 from both sides in the "Z" direction, as shown in FIG. 7, the first bent parts 112 and the second bent parts 122 cover the long side parts 10a and 10b of the coil 10 from both sides in the "X" direction. Further, the first fixing part 113 of the first plate 11 and the second fixing part 123 of the second plate 12 are overlapped with each other on both sides in the "Y" direction with respect to the first bent part 112 and the second bent part 122. The first fixing part 113 and the second fixing part 123 are fixed in the "Z" direction. Further, a claw part 157 provided on a side face of the first coil holding part 153 and a claw part 167 provided on a side face of the second coil holding part 163 are engaged with cut-out parts 114 provided in the first fixing parts 113 and cut-out parts 124 provided in the second fixing parts 123.

(Assembly Method of Coil Assembly)

When the actuator 1 is to be manufactured, the coil assembly 13 is assembled by using the coil 10, the first plate 11, the second plate 12, the first holder member 15 and the second holder member 16. For example, as shown in FIG. 6, the first coil holding part 153 and the second coil holding part 163 are fitted between a pair of the first fixing parts 113 from the "Z2" side at both ends in the "Y" direction of the first plate 11, and the claw parts 157 and 167 are protruded from the cut-out parts 114 of the first fixing parts 113 to both sides in the "X" direction. As a result, the first holder member 15 and the second holder member 16 are assembled in a state that they do not disengage from the first plate 11 in the "Y" direction.

After that, the coil 10 is arranged between the first coil holding part 153 and the second coil holding part 163, and coil wires (not shown) are arranged in the grooves 141 and led out to the "Y1" side through the cut-out part 158. Next, after an adhesive 18 (see FIGS. 2 and 3) is poured into a center hole 10c of the coil 10, the second plate 12 is attached so as to cover the coil 10 from the "Z2" side. In this case, a pair of the first fixing parts 113 is fitted between a pair of the second fixing parts 123 at both ends in the "Y" direction of the second plate 12, and the claw parts 157 and 167 are protruded from the cut-out parts 124 of the second fixing parts 123 to both sides in the "X" direction.

As shown in FIG. 7, when the coil assembly 13 has been assembled, the plate part 171 of the coil holder 17 is structured so that the coil holding part 173 (first coil holding part 153 and second coil holding part 163) is covered by the first plate 11 and the second plate 12, and the connection body fixing part 174 (one side fixing part 154 and the other side fixing part 164) are exposed. The one side fixing part 154 is extended to the "Y1" side with respect to the first plate 11 and the second plate 12, and the other side fixing part 164 is extended to the "Y2" side with respect to the first plate 11 and the second plate 12.

(Movable Body)

The movable body 5 includes a magnet 7 and a yoke 8. As shown in FIGS. 2 and 3, the magnet 7 faces the coil 10 in the "Z" direction. The coil 10 and the magnet 7 structure the magnetic drive circuit 6. The movable body 5 includes a first magnet 71 and a second magnet 72 as the magnet 7. The first magnet 71 is located on the "Z1" direction side with respect to the coil 10. The second magnet 72 is located on the "Z2" direction side with respect to the coil 10. The first magnet 71 and the second magnet 72 are polarized into two pieces in the "X" direction. As shown in FIG. 3, when the movable body 5 and the support body 3 are assembled, the long side parts 10a and 10b of the coil 10 face the first magnet 71 on the "Z1" direction side and face the second magnet 72 on the "Z2" direction side.

The yoke 8 is made of magnetic material. As shown in FIG. 3, the yoke 8 includes a first facing part 801 which faces the coil 10 from the "Z1" direction side and a second facing part 802 which faces the coil 10 from the "Z2" direction side. The first magnet 71 is fixed to the first facing part 801. The second magnet 72 is fixed to the second facing part 802. Further, the yoke 8 includes a pair of connection parts 803 which are extended in the "Z" direction on both sides in the "X" direction with respect to the coil 10. A pair of the connection parts 803 connects the first facing part 801 with the second facing part 802.

When the yoke 8 is to be assembled, a pair of connecting plate parts 805 extended to the "Z1" direction side from both ends in the "X" direction of the second facing part 802 is press-fitted and fixed to inner sides of a pair of connecting plate parts 804 extended to the "Z2" direction side from both ends in the "X" direction of the first facing part 801. As a result, a pair of the connection parts 803 is structured, and the yoke 8 is assembled in a shape so as to surround outer peripheral sides of the coil 10, the first plate 11 and the second plate 12. As shown in FIGS. 4 and 5, in this embodiment, a length in the "Y" direction of the connecting plate part 805 is shorter than that of the connecting plate part 804.

As shown in FIGS. 2 through 5, the yoke 8 includes a first yoke 81 and a second yoke 82. The first yoke 81 is structured of two members which are joined to each other, i.e., a first inner side member 83 overlapped with the coil 10 from the "Z1" direction side and a first outer side member 84 overlapped with the first inner side member 83 from the "Z1" direction side. The first magnet 71 is fixed to the first inner side member 83. The first outer side member 84 is provided with a first flat plate part 87 overlapped with the first inner side member 83 from the "Z1" direction side, and a pair of the connecting plate parts 804 which are extended from both ends in the "X" direction of the first flat plate part 87 to the "Z2" direction side.

The second yoke 82 is structured of two members which are joined to each other, i.e., a second inner side member 85 overlapped with the coil 10 from the "Z2" direction side and a second outer side member 86 overlapped with the second inner side member 85 from the "Z2" direction side. The second magnet 72 is fixed to the second inner side member 85. The second outer side member 86 is provided with a second flat plate part 88 overlapped with the second inner side member 85 from the "Z2" direction side, and a pair of the connecting plate parts 805 which are extended from both ends in the "X" direction of the second flat plate part 88 to the "Z1" direction side.

The first facing part 801 of the yoke 8 is structured by laminating the first flat plate part 87 of the first outer side member 84 and the first inner side member 83 in the "Z" direction. As shown in FIG. 2, a length in the "Y" direction of the first inner side member 83 is the same as that of the first magnet 71 and is shorter than that of the first flat plate part 87 of the first outer side member 84. Both ends in the "Y" direction of the first flat plate part 87 are provided with first connection body fixing parts 806 which are extended to the "Y1" side and the "Y2" side with respect to the first inner side member 83 and the first magnet 71. Two first connection body fixing parts 806 respectively face the connection body fixing parts 174 (one side fixing part 154 and the other side fixing part 164) of the coil assembly 13 in the "Z" direction.

The second facing part 802 of the yoke 8 is structured by laminating the second flat plate part 88 of the second outer side member 86 and the second inner side member 85 in the "Z" direction. As shown in FIG. 2, a length in the "Y" direction of the second inner side member 85 is the same as that of the second magnet 72 and is shorter than that of the second flat plate part 88 of the second outer side member 86. Both ends in the "Y" direction of the second flat plate part 88 are provided with second connection body fixing parts 807 which are extended to the "Y1" side and the "Y2" side with respect to the second inner side member 85 and the second magnet 72. Two second connection body fixing parts 807 respectively face the connection body fixing parts 174 (one side fixing part 154 and the other side fixing part 164) of the coil assembly 13 in the "Z" direction.

When the actuator 1 is to be assembled, the movable body 5 is assembled so as to surround the coil assembly 13, and the movable body 5 and the coil assembly 13 are connected with each other by the connection body 4. In other words, the first connection body fixing part 806 and the connection body fixing part 174 (one side fixing part 154 and the other side fixing part 164) facing in the "Z" direction are connected with each other through the first connection body 9A, and the second connection body fixing part 807 and the connection body fixing part 174 (one side fixing part 154 and the other side fixing part 164) facing in the "Z" direction are connected with each other through the second connection body 9B.

(Connection Body)

As shown in FIG. 2, the connection body 4 includes the first connection body 9A and the second connection body 9B. As shown in FIGS. 4 and 5, the first connection body 9A and the second connection body 9B are formed in a cuboid shape which is long in the "X" direction. The first connection body 9A is located on the "Z1" side with respect to the coil 10. The second connection body 9B is located on the "Z2" side with respect to the coil 10. The first connection body 9A is disposed at two positions on the "Y1" side and the "Y2" side with respect to the first magnet 71 and is structured of two members having the same shape. The second connection body 9B is disposed at two positions on the "Y1" side and the "Y2" side with respect to the second magnet 72 and is structured of two members having the same shape. Each of the first connection body 9A and the second connection body 9B is provided with at least one of elasticity and viscoelasticity.

The first connection body 9A is, as described above, sandwiched between the first facing part 801 of the yoke 8 and the connection body fixing part 174 of the coil holder 17 (one side fixing part 154 and the other side fixing part 164) on both sides in the "Y" direction of the coil 10. The first connection body 9A is compressed in the "Z" direction between the first facing part 801 and the connection body fixing part 174. The second connection body 9B is, as described above, sandwiched between the second facing part 802 of the yoke 8 and the connection body fixing part 174 on both sides in the "Y" direction of the coil 10. The second connection body 9B is compressed in the "Z" direction between the second facing part 802 and the connection body fixing part 174.

In this embodiment, the first connection body 9A and the second connection body 9B are gel state members made of silicone gel. More specifically, faces of the gel state member on the "Z1" direction side and the "Z2" direction side are stuck with a flexible film such as a PET sheet by adhesiveness of the gel state member itself, and the gel state member is joined to the movable body 5 and the support body 3 through the PET sheets. In this case, the PET sheet may be omitted. Silicone gel is a viscoelastic body whose spring constant when it deforms in an expansion and contraction direction is about three times of a spring constant when it deforms in a shearing direction. The viscoelastic body deforms in a pulled and extended direction when it deforms in a direction (shearing direction) intersecting a thickness direction and thus, the viscoelastic body has a deformation characteristic that a linear component is larger than a non-linear component. Further, the viscoelastic body has a deformation characteristic that a non-linear component is larger than a linear component when it is pressed in a thickness direction and is compressed and deformed and, on the other hand, when the viscoelastic body is pulled and extended in the thickness direction, it has a deformation characteristic that a linear component is larger than a non-linear component.

In accordance with an embodiment of the present invention, as the first connection body 9A and the second connection body 9B, the following material may be used; in other words, various rubber materials such as natural rubber, diene-based rubber (for example, styrene butadiene rubber, isoprene rubber, butadiene rubber, chloroprene rubber and acrylonitrile butadiene rubber), non-diene-based rubber (for example, butyl rubber, ethylene propylene rubber, ethylene propylene diene rubber, urethane rubber, silicone rubber and fluorine-containing rubber) and thermoplastic elastomer, and their denatured materials.

(Case)

As shown in FIGS. 1A through 3, the case 2 includes a first case member 30 and a second case member 40 which are overlapped in the "Z" direction. The first case member 30 is assembled to the coil assembly 13 from the "Z1" direction side. The second case member 40 is assembled to the coil assembly 13 and the first case member 30 from the "Z2" direction side.

The first case member 30 is provided with a first end plate part 31 in a substantially rectangular shape which faces the coil 10 from the "Z1" direction side, and a first side plate part 32 which is extended from an outer edge of the first end plate part 31 to the "Z2" direction side. The second case member 40 is provided with a second end plate part 41 in a substantially rectangular shape which faces the coil 10 from the "Z2" direction side, and a second side plate part 42 which is extended from an outer edge of the second end plate part 41 to the "Z1" direction side.

When the coil assembly 13 and the movable body 5 are to be accommodated into the case 2, as shown in FIG. 2, a tip end on the "Z1" direction side of the first holder side plate part 152 of the coil assembly 13 and a tip end on the "Z1" direction side of the second holder side plate part 162 are abutted with the first end plate part 31 from the "Z2" direction side. As a result, the coil assembly 13 is positioned in the "Z" direction with respect to the first case member 30.

As shown in FIGS. 4 and 5, the coil assembly 13 is provided with a first receiving part 159, which is protruded to the "Y1" direction side from a "Y1" side face of the first holder side plate part 152, and a second receiving part 169 which is protruded to the "Y2" direction side from a "Y2" side face of the second holder side plate part 162. When the first case member 30, the coil assembly 13 and the movable body 5 are to be covered by the second case member 40 from the "Z2" direction side, as shown in FIG. 2, the second side plate part 42 of the second case member 40 is abutted with the first receiving part 159 and the second receiving part 169 from the "Z2" direction side. As a result, the second case member 40 is positioned in the "X" direction with respect to the first case member 30 through the coil assembly 13.

(Principal Operations and Effects of this Embodiment)

As described above, the actuator 1 in this embodiment includes the movable body 5, the support body 3 having the coil holder 17, the connection body 4 which is connected with the movable body 5 and the support body 3, and the magnetic drive circuit 6 which includes the coil 10 held by the coil holder 17 and the magnet 7 facing the coil 10 in the "Z" direction (first direction) and is structured to vibrate the movable body 5 with respect to the support body 3 in the "X" direction (second direction) intersecting the "Z" direction. The coil holder 17 is provided with the plate part 171 (first plate part 151 and second plate part 161) which surrounds an end part on the "Y1" direction side (one side in the third direction) of the coil 10 and an end part on the "Y2" direction side (the other side in the third direction) of the coil 10. The movable body 5 includes the yoke 8 which holds the magnet 7, and the yoke 8 includes the first facing part 801 which faces the coil 10 from the "Z1" direction side (one side in the first direction), and the second facing part 802 which faces the coil 10 from the "Z2" direction side (the other side in the first direction). The magnet 7 includes the first magnet 71 fixed to the first facing part 801 and the second magnet 72 fixed to the second facing part 802. The plate part 171 of the coil holder 17 is provided with the coil holding part 173 (first coil holding part 153 and second coil holding part 163) along an outer edge of an end part on the "Y1" direction side of the coil 10 and an outer edge of an end part on the "Y2" direction side of the coil 10, and the connection body fixing part 174 (one side fixing part 154 and the other side fixing part 164) whose plate thickness in the "Z" direction is thinner than that of the coil holding part 173. The connection body 4 includes the first connection body 9A, which connects the first facing part 801 with the connection body fixing part 174 (one side fixing part 154 and the other side fixing part 164), and the second connection body 9B which connects the second facing part 802 with the connection body fixing part 174 (one side fixing part 154 and the other side fixing part 164).

In this embodiment, the connection body 4 is disposed at a position where the coil holder 17 and the yoke 8 face each other in the "Z" direction. The coil holder 17 is structured so that a plate thickness in the "Z" direction of the connection body fixing part 174 where the connection body 4 is disposed is thinner than that of the coil holding part 173 provided along an outer edge of the coil 10. Therefore, even when a gap between the magnet 7 fixed to the yoke 8 and the coil 10 is reduced, since a thickness of the connection body fixing part 174 is also reduced, a thickness of the connection body 4 is restrained from becoming small and a sufficient thickness of the connection body 4 can be secured. Therefore, acceleration when the movable body 5 is vibrated can be increased by setting the gap between the magnet 7 and the coil 10 to be small and, in addition, a situation can be avoided that a thickness of the connection body 4 becomes too small and the connection body 4 is unable to vibrate stably. Further, when a thickness of the connection body 4 is set to be a dimension not less than an amplitude of the movable body 5, the movable body 5 can be stably supported and a stable vibration characteristic is attained. In this embodiment, a thickness of the connection body 4 is set to be two times or more of the amplitude of the movable body 5.

In this embodiment, the coil holding part 173 (first coil holding part 153 and second coil holding part 163) surrounds the "Y1" direction side and the "Y2" direction side of the coil 10, and the connection body fixing part 174 is provided with the one side fixing part 154 provided on the "Y1" direction side with respect to the coil 10 and the other side fixing part 164 provided on the "Y2" direction side with respect to the coil 10. The one side fixing part 154 and the other side fixing part 164 are respectively connected with the first facing part 801 and the second facing part 802 through the first connection body 9A and the second connection body 9B. As described above, both side portions on the "Y1" direction side of the coil holder 17 are respectively connected with the yoke 8 on both sides in the "Z" direction through the connection body 4 (first connection body 9A and second connection body 9B) and thus, the movable body 5 can be stably supported.

In this embodiment, the plate part 171 of the coil holder 17 is provided with the first recessed part (the first recessed part 155 of the first plate part 151 and the first recessed part 165 of the second plate part 161) which is recessed to the "Z1" direction side, and the second recessed part 156 which is recessed to the "Z2" direction side on an opposite side to the first recessed part 155 in the "Z" direction, and the second recessed part 166 which is recessed to the "Z2" direction side on an opposite side to the first recessed part 165 in the "Z" direction. The connection body fixing part 174 is the one side fixing part 154, which is a thin wall part whose surfaces are a bottom face of the first recessed part 155 and a bottom face of the second recessed part 156, and the other side fixing part 164 which is a thin wall part whose surfaces are a bottom face of the first recessed part 165 and a bottom face of the second recessed part 166. The first connection body 9A connects the first facing part 801 with the bottom faces of the second recessed parts 156 and 166. The second connection body 9B connects the second facing part 802 with the bottom faces of the first recessed parts 155 and 165. As described above, both faces in the "Z" direction of the plate part 171 are respectively formed with the recessed parts and thus, a distance in the "Z" direction with respect to the yoke 8 is widened by a depth of the recessed part on both sides in the "Z" direction of the plate part 171. Therefore, even when a gap between the coil 10 and the first magnet 71 facing the coil 10 from the "Z1" direction side is narrowed and, in addition, even when a gap between the coil 10 and the second magnet 72 facing the coil 10 from the "Z2" direction side is narrowed, a situation is avoided that a thickness of the connection body 4 (first connection body 9A and second connection body 9B) becomes so small that the connection body 4 is unable to vibrate stably.

In this embodiment, the support body 3 includes the first plate 11 made of metal, which is overlapped with the coil 10 and the coil holding part 173 (first coil holding part 153 and second coil holding part 163) from the "Z1" direction side, and the second plate 12 made of metal which is overlapped with the coil 10 and the coil holding part 173 from the "Z2" direction side. The connection body fixing part 174 (one side fixing part 154 and the other side fixing part 164) is exposed from the first plate 11 and the second plate 12. Therefore, the coil 10 can be protected by the first plate 11 and the second plate 12 and thus, even when a gap between the magnet 7 and the coil 10 is narrowed, the coil 10 is less likely to be damaged due to a collision with the magnet 7. Further, the connection body fixing part 174 (one side fixing part 154 and the other side fixing part 164) is exposed from the first plate 11 and the second plate 12 and thus, a height in the "Z" direction of an arrangement space of the connection body 4 (first connection body 9A and second connection body 9B) is not reduced and a thickness of the connection body 4 can be secured.

In this embodiment, the first plate 11 is provided with the first fixing part 113 which is bent in the "Z" direction from both ends in the "X" direction (second direction) and is engaged with a side face in the "X" direction of the coil holding part 173 (first coil holding part 153 and second coil holding part 163). The second plate 12 is provided with the second fixing part 123 which is bent in the "Z" direction from both ends in the "X" direction (second direction) and is engaged with a side face in the "X" direction of the coil holding part 173 (first coil holding part 153 and second coil holding part 163). As a result, the first plate 11, the second plate 12, the coil holder 17 and the coil 10 are assembled to be capable of handling as the coil assembly 13 and thus, even when the coil holder 17 is divided into two members, i.e., the first holder member 15 and the second holder member 16, the actuator 1 can be easily assembled.

In this embodiment, the coil holder 17 includes the first holder member 15 disposed on the "Y1" direction side with respect to the coil 10 and the second holder member 16 disposed on the "Y2" direction side with respect to the coil 10. The coil holding part 173 includes the first coil holding part 153, which is provided at an end part on the "Y2" direction side of the first holder member 15, and the second coil holding part 163 which is provided at an end part on the "Y1" direction side of the second holder member 16. The connection body fixing part 174 includes one side fixing part 154 provided on the "Y1" direction side with respect to the first coil holding part 153 and the other side fixing part 164 provided on the "Y2" direction side with respect to the second coil holding part 163. As described above, the coil holder 17 is divided into two members and thus, portions covering both sides in the "X" direction of the coil 10 can be omitted. As a result, a size in the "X" direction of the movable body 5 can be reduced, and a size in the "X" direction of the actuator 1 can be reduced.

In this embodiment, the coil holder 17 is provided with the first holder side plate part 152 which is extended in the "Z" direction at an end part on the "Y1" direction side, and the power feeding board 14 is fixed to the first holder side plate part 152. The plate part 171 is provided with the groove 141 in which a coil wire extended from the coil 10 is disposed, and the groove 141 is extended to the cut-out part 158, which is formed by cutting out the first holder side plate part 152 in the "Z" direction, through the faces of the first coil holding part 153 and the one side fixing part 154. Therefore, when the coil wire is to be extended to the power feeding board 14, the coil wire can be extended without interfering with the connection body 4 (second connection body 9B).

(Modified Embodiments)

(1) In the embodiment described above, the coil holder 17 is divided into two members, i.e., the first holder member 15 and the second holder member 16. However, the coil holder 17 may be structured of one member. For example, it may be structured that a portion is provided which is extended in the "Y" direction on both sides in the "X" direction of the coil 10 to connect the first holder member 15 with the second holder member 16 so that the entire periphery of the coil 10 is surrounded by the coil holder 17.

(2) The coil holder 17 in the embodiment described above is structured so as to surround the "Y1" side and the "Y2" side of the coil. However, the coil holder 17 may be structured to surround other portions of the coil. For example, the coil holder 17 may be formed in a shape so as to surround the "X1" side and the "X2" side of the coil. Further, in the embodiment described above, the connection body fixing part 174 is disposed at two positions, i.e., on the "Y1" side and the "Y2" side with respect to the coil. However, the connection body fixing part 174 may be arranged in another position. For example, the connection body fixing part 174 may be disposed on the "X1" side and the "X2" side with respect to the coil 10.

(3) In the embodiment described above, the plate part 171 of the coil holder 17 is provided with the first recessed parts 155 and 165, which are recessed to the "Z1" direction side, and the second recessed parts 156 and 166 which are recessed to the "Z2" direction side and thereby, a height of a space where the connection body 4 is disposed is increased on both sides in the "Z" direction of the plate part 171. However, only one of the first recessed parts 155 and 165, and only one of the second recessed parts 156 and 166 may be provided.

(4) In the embodiment described above, the first magnet 71 and the second magnet 72 are provided as the magnet 7. However, only one of the first magnet 71 and the second magnet 72 may be provided.

(5) In the embodiment described above, the first connection body 9A and the second connection body 9B are provided as the connection body 4. However, only one of the first connection body 9A and the second connection body 9B may be provided. Further, the first connection body 9A and the second connection body 9B are respectively disposed at two positions, but may be disposed at one position or three or more positions.

(6) In the embodiment described above, the yoke 8 is structured so that each of the first yoke 81 and the second yoke 82 is laminated of an inner side member and an outer side member. However, each of the first yoke 81 and the second yoke 82 may be structured of only an outer side member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a movable body;
   a support body comprising a coil holder;
   a connection body which is connected with the movable body and the support body; and
   a magnetic drive circuit which comprises a coil held by the coil holder and a magnet facing the coil in a first direction and is structured to vibrate the movable body with respect to the support body in a second direction intersecting the first direction;
   wherein the coil holder comprises a plate part which surrounds at least a part of the coil;
   the movable body comprises a yoke which holds the magnet;
   the yoke comprises a first facing part which faces the coil from one side in the first direction and a second facing part which faces the coil from an other side in the first direction;
   the magnet is fixed to at least one of the first facing part and the second facing part;
   the plate part comprises a coil holding part along an outer edge of the coil and a connection body fixing part whose plate thickness in the first direction is thinner than a plate thickness of the coil holding part; and
   the connection body comprises at least one of a first connection body which connects the first facing part with the connection body fixing part and a second connection body which connects the second facing part with the connection body fixing part.

2. The actuator according to claim 1, wherein
   when a direction intersecting the first direction and the second direction is referred to as a third direction,
   the coil holding part surrounds one side in the third direction of the coil and an other side in the third direction of the coil,
   the connection body fixing part comprises one side fixing part provided on the one side in the third direction with respect to the coil and an other side fixing part provided on the other side in the third direction with respect to the coil, and
   the one side fixing part and the other side fixing part are respectively connected with the first facing part and the second facing part through the first connection body and the second connection body.

3. The actuator according to claim 1, wherein
   the plate part comprises a first recessed part which is recessed to the other side in the first direction and a second recessed part which is recessed to the one side in the first direction on an opposite side in the first direction with respect to the first recessed part,
   the connection body fixing part is a thin wall part whose surfaces are a bottom face of the first recessed part and a bottom face of the second recessed part,
   the first connection body connects the first facing part with the bottom face of the first recessed part, and
   the second connection body connects the second facing part with the bottom face of the second recessed part.

4. The actuator according to claim 1, wherein
   the support body comprises:
   a first plate made of metal which is overlapped with the coil and the coil holding part from the one side in the first direction; and
   a second plate made of metal which is overlapped with the coil and the coil holding part from the other side in the first direction, and
   the connection body fixing part is exposed from the first plate and the second plate.

5. The actuator according to claim 4, wherein
   the first plate comprises a first fixing part which is bent from both ends in the second direction to the other side in the first direction and is engaged with a side face in the second direction of the coil holding part, and
   the second plate comprises a second fixing part which is bent from both ends in the second direction to the one side in the first direction and is engaged with the side face in the second direction of the coil holding part.

6. The actuator according to claim 1, wherein
   when a direction intersecting the first direction and the second direction is referred to as a third direction,
   the coil holder comprises a first holder member disposed on one side in the third direction with respect to the coil and a second holder member disposed on an other side in the third direction with respect to the coil,
   the coil holding part comprises:
   a first coil holding part provided at an end part on the other side in the third direction of the first holder member; and a second coil holding part which is provided at an end part on the one side in the third direction of the second holder member, and the connection body fixing part comprises:
one side fixing part which is provided on the one side in the third direction of the first coil holding part; and
an other side fixing part which is provided on the other side in the third direction of the second coil holding part.

7. The actuator according to claim 1, wherein
when a direction intersecting the first direction and the second direction is referred to as a third direction,
the coil holder comprises a first holder side plate part which is extended in the first direction at an end part on one side in the third direction of the coil holder,
a board is fixed to the first holder side plate part,
the plate part is provided with a groove in which a coil wire extended from the coil is disposed, and
the groove is extended to a cut-out part which is formed by cutting out the first holder side plate part in the first direction through surfaces of the coil holding part and the connection body fixing part.

* * * * *